Aug. 25, 1959 — H. NAFTULIN ET AL — 2,901,112
COMBINING TUBE AND FILTER THEREFOR
Filed May 10, 1957
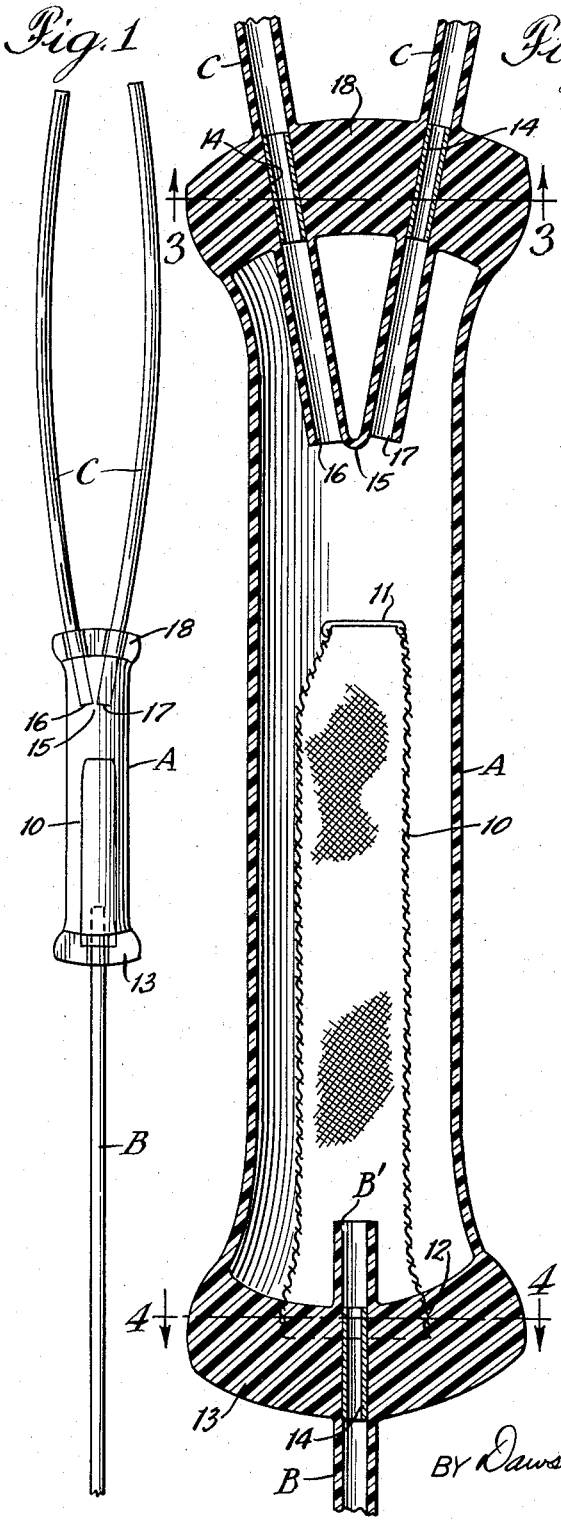
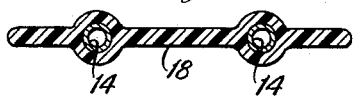
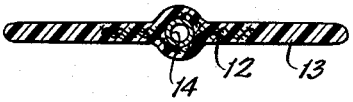
INVENTORS:
Henry Naftulin
and Robert Egge,
BY Dawson, Tilton, Fallon & Lungmus
ATTORNEYS.

2,901,112

COMBINING TUBE AND FILTER THEREFOR

Henry Naftulin, Skokie, and Robert Egge, Midlothian, Ill., assignors to Michael Reese Research Foundation, Inc., Chicago, Ill., a corporation of Illinois Application May 10, 1957, Serial No. 658,428

6 Claims. (Cl. 210—94)

This invention relates to a combining tube and method of forming, and is particularly useful in connection with the combining or mixing of fluids within a filter tube, sight tube, drip tube, or the like.

An object of the present invention is to provide a combining or mixing tube in which parenteral fluids may be combined or mixed just prior to administration. A further object is to provide a method and means for forming a plastic combining tube in which inlet tubes are directed toward each other for the admixing of fluids centrally of the combining tube so as to avoid obscuring the walls of the transparent combining tube. A still further object is to provide a novel method of forming a mixing or combining tube in which the fluid may be filtered after admixture in a central portion of the tube. Yet another object is to provide an inexpensive and quick method of forming a combining tube utilizing thermoplastic tubes and the joining of inlet tubes to bring about a discharge in line with a central outlet or filter. A further object is to provide a new filter and mixing tube having important new advantages in the mixing of fluids while keeping the walls of the tube relatively clear and unobscured. Other specific objects and advantages will appear as the specification proceeds.

The invention is shown, in an illustrative embodiment, by the accompanying drawing, in which Figure 1 is a broken top plan view of a combining tube equipped with inlet and outlet tubes in a manner embodying our invention; Fig. 2, an enlarged longitudinal sectional view of the combining tube structure; Fig. 3, a transverse sectional view, the section being taken as indicated at line 3—3 of Fig. 2; and Fig. 4, a transverse sectional view, the section being taken as indicated at line 4—4 of Fig. 2.

In the illustration given, A designates a combining or mixing tube, B a discharge or dispensing tube, and C a pair of inlet tubes.

The combining tube A is formed of plastic and preferably of transparent thermoplastic material such as vinyl resin, polyethylene, ethylene terephthalate, or any other suitable resin. The tube may be used with or without a filter. In the specific illustration given, a filter 10, formed of nylon or other suitable material, is supported centrally within the tube A, the tube being sealed along upper edges at 11 and having a lower portion 12 thereof sealed within a flange 13 or flattened portion of the tube A. The outlet tube B extends through the flange 13 and has a portion B' extending inwardly of the flange 13 and within the filter 10. A metal tube 14 extends through the flange or flattened tube portion 13 and provides communication between the outlet tube portions B and B'.

The foregoing structure is formed by inserting the metal tube 14 within the original tube B and inserting tube B within an end portion of the tube A and thereafter fusing or heat welding the end walls of the tube A to form the flange 13 while at the same time integrating the thermoplastic walls of the tube B with the plastic of tube A and around the metal tube 14. In this operation, effective welding or fusing is brought about by utilizing the metal tube 14 as an electrode or conductor in the dielectric heating of the plastic, after which the required pressure is applied for fusion. The metal tube is a conductor for the RF waves so that they can bridge the gap across the internal diameter of the tubing without such loss of power as might impair or prevent the weld occurring at that point.

The inlet tube C may lead from different sources of fluid as, for example, from a container of blood, blood serum, or other blood fraction, and the other inlet tube may be from a liquid source which is to be admixed with the blood fraction. It will be understood that the inlet tubes may be employed to mix any type of parenteral fluid and instead of two tubes there may be any desired number.

We find that the tubes C can be effectively and quickly secured in admixing relation within the enlarged tube A by taking a single tube, bending it, and then cutting away a portion of the tube at the point of bend. This leaves the tubes connected by an integral common wall 15 located between the discharge ends 16 and 17. By arranging the tubes in the V formation illustrated at the top of Fig. 2, the two fluids are directed toward each other for effective admixture in the central portion of the tube A, thus avoiding the splashing or obscuring of the side walls of the transparent tube A. Further, this operation permits metal tubes 14 to be introduced through the open ends 16 and 17, as shown in Fig. 2, and the tubes are automatically held in the desired V-arrangement during the subsequent heat welding operation. In the heat welding operation, the walls of the tubes C are integrated with the plastic walls of the tube A to form a single unitary flange 18, as shown best in Fig. 3.

In this operation, any well known equipment for fusing the plastic may be employed. We find that the use of the small metal tubes enables the current to bridge the gap across the internal diameter of the tubing without such loss of power as might impair or prevent the weld occurring at that point, and pressure is applied for fusion after such a period of preheating the material. This brings about a fusion of the overlapping walls of tube A and tube C into the single integrated structure shown best in Fig. 3. Since such heat welding apparatus is well known, a further detailed description herein is believed unnecessary.

In the operation of the structure described, the separate tubes C may lead from different liquids or other fluids which are to be combined and direct the fluids toward each other in the central portion of tube A to bring about admixture. At the same time, the admixing operation is carried on centrally within tube A so that there is little tendency for splashing or obscuring the upper walls of the tube A. The metal tubes 14 insure full flow through the closure flange 18 and further cooperate with the flange 18 in supporting the inclined tubes C for discharge toward a common central line within tube A, this line being central to the filter 10 and to the discharge tube B.

The metal tubes 14 may be formed of any suitable rigid material such as aluminum, stainless steel, or other metals effective for heat welding to plastic, while at the same time providing a mandrel support for facilitating the fusing of the plastic without closure of the inlet tubes.

While we have emphasized a specific method which we prefer to employ in the assembly of the apparatus, it will be understood that the invention may be practiced by utilizing other procedure as, for example, by inserting separate tubes C in the positions shown and holding them during the fusing step and thus utilizing the metal mandrel tubes 14 for the holding of the inlet tubes in the desired relation. Changes in the form and positioning of the elements may obviously be changed without departing from the invention herein, and while we have described the structure and method of forming in considerable detail for the purpose of illustrating an embodiment of the invention, it will be understood that such details may be varied widely by those skilled in the art without departing from the spirit of our invention.

We claim:

1. A fluid combining tube, comprising an enlarged transparent plastic tube having one end provided with an outlet and the other end sealed about at least two plastic inlet tubes, said inlet tubes having end portions projecting into the interior of the large tube, said end portions terminating in a pair of adjacent discharge openings within said enlarged tube and being held together adjacent the central portion of said enlarged tube for discharge thereinto.

2. The structure of claim 1, in which the inlet tubes have a common integral wall between their respective discharge openings tying said tubes together.

3. The structure of claim 1, in which the end portions of said inlet tubes are sealed in a V-position within an end portion of said enlarged plastic tube.

4. A fluid combining tube, comprising a transparent plastic filter tube having one end provided with an outlet and a filter centrally located within said tube, inlet tubes extending into the enlarged tube and integrated therewith, the inlet tubes being pointed toward each other and defining a pair of adjacent openings for discharging toward a line extending perpendicularly through said filter.

5. A fluid combining tube, comprising a transparent enlarged plastic tube having one end provided centrally with an outlet and the other end sealed about at least two inlet tubes, said inlet tubes being supported within said sealed end of said first mentioned tube in a V-arrangement and defining a pair of open ends adjacent each other within said first mentioned tube and in vertical alignment with said central outlet.

6. The structure of claim 5, in which a metal tube lies within each of said inlet tubes connecting the portions inside and outside of said enlarged plastic tube.

References Cited in the file of this patent

UNITED STATES PATENTS

| | | |
|---|---|---|
| 662,509 | Broeck | Nov. 27, 1900 |
| 2,203,072 | Albright | June 4, 1940 |
| 2,586,513 | Butler | Feb. 19, 1952 |
| 2,697,521 | Cherkin et al. | Dec. 21, 1954 |
| 2,701,565 | Gewecke | Feb. 18, 1955 |
| 2,709,279 | Raiche | May 31, 1955 |

FOREIGN PATENTS

| | | |
|---|---|---|
| 521,205 | Canada | Jan. 31, 1956 |